United States Patent [19]

Evans et al.

[11] 3,884,719
[45] May 20, 1975

[54] BATTERY
[75] Inventors: Richard C. Evans; Murray A. Heine, both of Hamden; Stanley J. Ciosek, East Haven, all of Conn.
[73] Assignee: Olin Mathieson Chemical Corporation, New Haven, Conn.
[22] Filed: June 29, 1955
[21] Appl. No.: 518,718

[52] U.S. Cl. .............. 136/90; 136/120; 136/131; 136/153
[51] Int. Cl. ......................................... H01m 21/14
[58] Field of Search ........... 136/90, 90.5, 120, 131, 136/153, 153 S

[56] References Cited
UNITED STATES PATENTS
159,817  11/1954  Australian .............................. 136/90
713,652  11/1902  Kitsee ................................. 136/90.5
856,162   6/1907  Kitsee ................................. 136/153.2
2,707,199  4/1955  Ruben .................................. 136/90

Primary Examiner—Verlin R. Pendegrass
Attorney, Agent, or Firm—Donald R. Motsko; H. Samuel Kieser; W. W. Jones

EXEMPLARY CLAIM

1. An electrode for a heat activated cell of the stacked disc type comprising a nickel metallic folder of circular planar section having a narrow joining fold portion between its leaves which enclose a layer of electrolyte fusible heat producing composition, the outer face of one of said leaves being coated with calcium.

9 Claims, 8 Drawing Figures

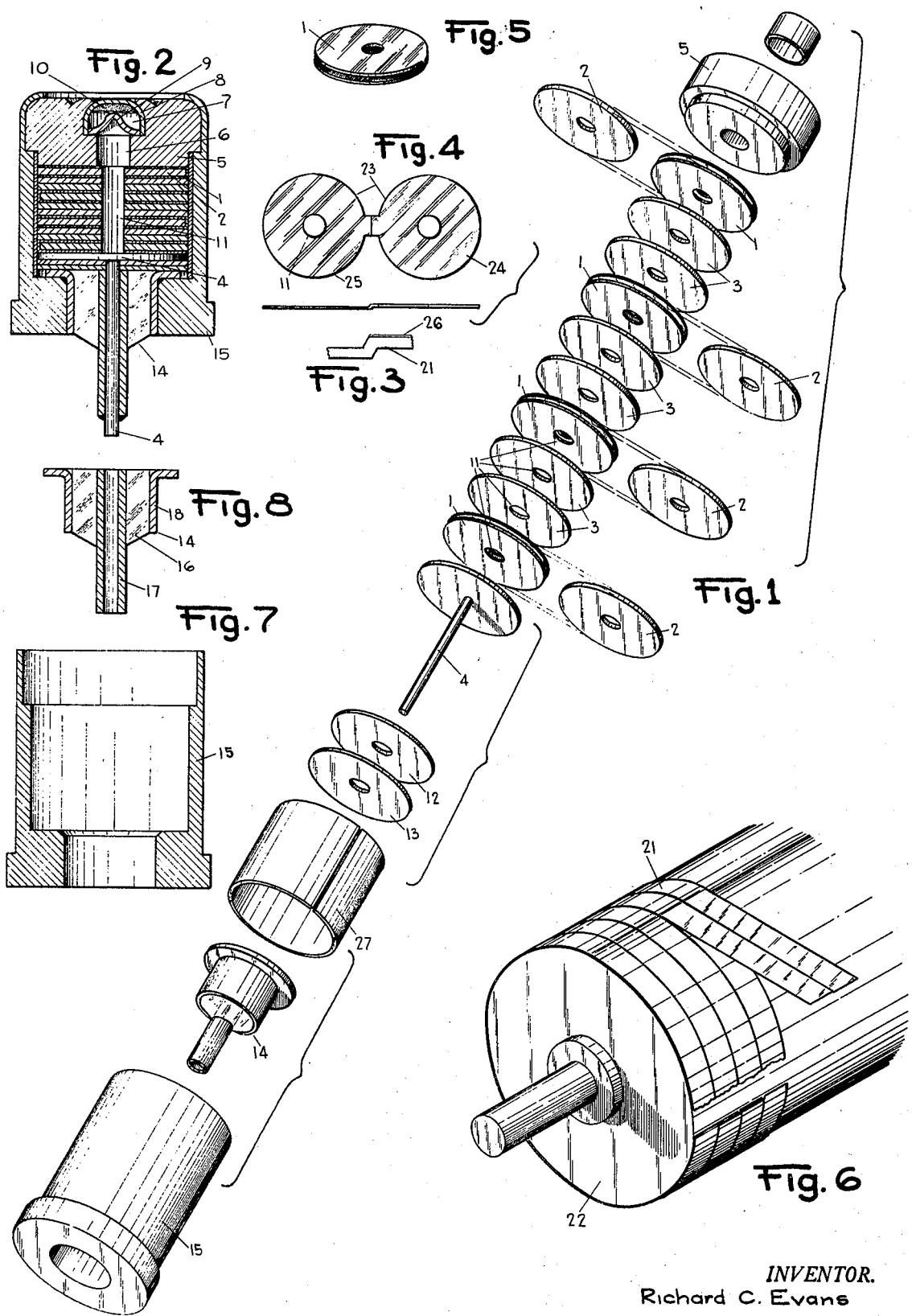

3,884,719

BATTERY

This invention relates to a battery and more particularly to a thermal battery.

Thermal batteries are standard current generating cells having two electrodes spaced from each other by an electrolyte solution. However, in thermal batteries the electrolyte solution is in a solid state until heat produced by the heat generating means fuses the electroylte, at which time it acts as a solution. It is only in this fused state that current is generated. Since the cell is only active when the salt is fused, it can obviously be stored indefinitely. It also should be obvious that the cell is useful only where quick bursts of electrical energy such as in ammunition fuzes and the like are needed because the heat source within the cell is limited. Generally, in this use, it was desired to start the generating current almost immediately upon ignition of the heat source. Heretofore, starting times were greater than 0.25 seconds. Furthermore, the complicated construction and large size necessary for the elements of the battery seriously limited the utility. They were only useful for providing power to electronic tubes and their circuits. Use in electric detonators and the like was rare because not only did they contain energy far in excess of that required but were also of too large dimension.

An object of this invention is to provide a thermal battery which is exceptionally small in size. Another object of this invention is to provide a thermal battery having a quick activation time. Another object of this invention is to provide a thermal battery whose components are simple to construct and to assemble. And another object of this invention is to provide a thermal battery which by its small size and quick activation time is exceptionally useful as a power source.

Other objects will become apparent to those skilled in the art upon reading the following detailed disclosure and drawings, in which FIG. 1 is a perspective view of the component parts of the thermal battery of this invention shown in unassembled but located position, FIG. 2 is a side view of the assembled thermal battery of this invention, FIG. 3 is a cross sectional view of the nickel ribbon used in making up the electrodes of the battery of this invention, FIG. 4 is a planar view of the dumbbell shaped nickel electrode showing the calcium coating on one side of one of the circles of the dumbbell shaped electrode, FIG. 5 is a perspective view of an electrode of the battery, FIG. 6 is a perspective view of the drum with a helical winding of nickel ribbon thereon used in partly coating the ribbon with calcium metal, FIG. 7 is a side view of the container of the thermal battery of this invention, and FIG. 8 is a side view of the glass seal of this invention.

The thermal battery of this invention has one or more stacked nickel electrode sandwiches, one outer side of which has a calcium coating thereon. The layers of the sandwich are joined by a tab and enclose a disc of heat generating material, each layer being separated by one or more electrolyte discs, all mounted within an insulated metal container. More particularly speaking, the thermal battery which accomplishes the objects of this invention has one or more stacked nickel electrode sandwiches made by stamping dumbbell shaped structures from a nickel ribbon, half of which has been coated, on one side with calcium, and folding over the structure at its midsection. Between these tab joined layers is contained heat paper to form a sandwich of paper between nickel electrodes. The heat paper is capable of fusing electrolyte discs stacked between each nickel assembly, all contained within an insulated metal container. Each end of the container contains one external electrode.

Referring to the drawing for a more specific disclosure of this invention, there is shown an embodiment of the thermal battery of this invention. It consists of a series of outer one side calcium coated nickel electrodes 1 which have been manufactured by coating a helically wound overlapping nickel strip 21 with calcium, (see FIG. 6) stamping out dumbbell shaped structures 23 from said strip, (see FIG. 4) and folding over said structures with the calcium coated side out to form the tabbed sandwich structure shown (see FIG. 5). Between the layers of each nickel electrode is contained a heat paper disc 2, each electrode assembly being separated by one or more electrolyte discs 3. The number of electrolyte discs determines the life of the battery. A unit cell comprises the calcium coated section of a nickel electrode 1, one or more electrolyte discs 3 and the uncoated section of the next nickel electrode 1, the tab of each nickel electrode acting as a conductor in series of the several cells in the entire assembly. In electrical contact with the lower most nickel electrode is a flat mushroom shaped terminal 4. At the other end of the several layers of electrodes and electrolyte discs, is contained a primer holder 5. It is of rod shape, having an axial shouldered annular cavity 6 therein. Within this cavity is contained a primer 7. This primer has a standard cup shaped container 8 having an anvil 9 and a priming mixture 10 therein. An electrical primer could also be employed if desired. The electrode adjacent the primer holder 5 is uncoated and acts merely as the nickel electrode of the top cell and as the conductor between teh various stacked cells in series with each other by the tab of each nickel electrode. As stated above, within each nickel electrode folded dumbbell-shaped structure is contained a heat paper disc 2. This disc contains a combustible mixture and generates sufficient heat when ignited to melt or fuse the electrolyte salt in the electrolyte disc 3. Ignition is accomplished by providing a flash hole 11 axially through each cell, which communicates with the primer 7. It is also possible to use circumferential ignition; i.e., ignition from the outside, in which case, non-perforated cell elements would be used.

The stem portion of the terminal 4 extends through an asbestos insulator disc 12, a mica insulator disc 13 and a hollow-stem mushroom shaped glass seal 14. The glass seal consists of a tubular glass structure 16 between two concentric metal alloy tubes 17 and 18. The stem of the terminal 4 extends and protrudes from the hollow stem of the glass seal. It acts as the negative electrode of the assembled battery.

The elements discussed above are all assembled in sandwiched fashion within a container 15, preferably made of metal. Between the walls of the container and the edges of the several layers of cell assemblies is a sheet 27 of mica insulation. The upper edges of the container are folded in and fitted to the edge of the primer holder 5.

In assembled form, the head of the primer 7, as well as the primer holder 5 is visible at the top of the battery and the stems of terminal 4 and glass seal 14 are visible at the bottom of the battery.

Each individual element of the battery disclosed herein may be constructed according to the techniques described hereinafter.

The Electrodes

The outer one side calcium coated nickel electrodes are made by taking a strip 21 of quarter-hard nickel which has been offset at its center line (see FIG. 3), degreasing and winding with a half width overlap on a tapered drum 22, (see FIG. 6). The exposed part of the nickel strip is then cleaned with detergent, water, alcohol and acetone successively. The nickel wound drum is then mounted in a fixture in a vacuum metallizer.

In a separate assembly, calcium metal crystals are prefused into two conical-shaped steel crucibles in an atmosphere of helium. These crucibles are then placed in an insulated induction heating coil arrangement powered by a 4 kilowatt spark gap induction heater within the vacuum metallizer, (preferably a metallizer manufactured by the Naresco Equipment Corporation, Newton Highlands, Mass.), in which the drum is mounted. A high voltage glow discharge cleaning operation of the nickel strip is next effected. The vapor is then evacuated and when it has reached an atmospheric pressure of about $1.0 \times 10^{-4}$, millimeters the crucibles are outgassed by heating them gently with repeated bursts of induction heating. When the air pressure has been returned to a value less than $1 \times 10^{-4}$ millimeters, the evaporation is started. The evaporation is allowed to proceed for a time sufficient to give the desired thickness of coat (30 minutes for a coat of about 0.002 inches) after which helium gas is bled slowly into the system through a calcium chloride drying tube. When the system has cooled to room temperature, the drum is removed from the evaporator and placed in a dry room with a relative humidity of less than about 5 percent. The calcium partly coated nickel strip is unwound from the drum. The nickel strip is then passed through a die cutter where dumbbell shaped structures 23 (see FIG. 4) are then cut from the calcium coated strip, the cut being made so that one circular planar section 24 is calcium coated on one side and the other section 25 is bare on both sides. The dumbbell shaped structure is then folded over at its joining bar so that the calcium coating 26 of the one side coated circular planar section 24 is facing outwardly.

The Electrolyte Discs

The electrolyte discs are formed by impregnating a closely woven tape such as 0.003 inch "B" weave Fiberglas tape (Owens-Corning Fiberglas Company of Newark, Ohio) (woven by the Hess-Goldsmith and Company, Horace Linton Division, Philadelphia, Pa.) with a molten electrolyte and then die-cutting the parts.

The electrolyte composition for use as the molten electrolyte referred to above may consist of:

50% by weight of lithium chloride
50% by weight of potassium chloride
100%

15% by weight of $K_2Cr_2O_7$ of the above mixture is added as the depolarizer and blended in a ball mill for 16 hours using flints. The material is checked occasionally to be sure that no caking has taken place.

Fiberglas tape as it comes from the manufacturer contains a starch binder. The binder is burned out by passing it through an electric furnace at a speed and temperature sufficient for such purpose. The tape is then passed through a pot of the molten electrolyte at a rate sufficient to effect impregnation by the salt. The pot temperature is maintained at about 465°C, the temperature effecting the thickness of the coat. After the tape leaves this bath and permitted to cool, it is then cut into discs. The discs are vacuum dried at 60°C. for one hour prior to assembly.

The Heat Paper Disc

The heat paper consists of a mixture of powdered zirconium, barium chromate, glass and aluminum silicate. It is made by taking about 5 parts of glass fiber, about 5 parts of aluminum silicate fiber and about 675 parts water and blending in an Oster blender (manufactured by John Oster Manufacturing Company, Racine, Wis.). The blender is run for about one minute or a time just sufficient to disperse the fibers in the water. Zirconium (15.5 parts) is weighed under water and placed in a second Oster blender. Barium chromate (34.5 parts) is next weighed out and placed in the blender adding sufficient water (about 175 parts) to fill the blender three-fourths full. The blender is run for about one minute or until sufficient mixing takes place.

A standard Williams sheet mold (manufactured by Williams Apparatus Company, Watertown, N.Y.) is filled three-fourths full of water. The glass and aluminum silicate fiber mixture is then poured into the mold and distributed evenly by stirring. The water level is allowed to drop sufficient to lay down a retaining mat of fiber. The zirconium-barium chromate mixture is then poured into the mold and distributed evenly taking care not to disturb the fiber mat. The mold is drained and the sheet is removed from the mold and placed between two pieces of thick blotter paper. The water is pressed out under approximately 2,000 lbs. pressure on the ram of a hydraulic press. The paper is then cut into strips and dried on a sheet dryer set at about 220°F. after which the strips are cut into discs.

Container

The container is fabricated according to the design shown in FIG. 4.

The Glass Seal

The glass seal is obtained from Stupakoff Ceramic and Manufacturing Company, Latrobe, Pa.

Battery Assembly

The battery is assembled (see FIGS. 1 and 2, especially) by first soldering the glass seal 14 into the container 15 using a 50–50 soft solder and resin flux. Soldering is performed in a muffle furnace (1200°F.). The time generally required for solder flow is about 20–30 seconds. After the seal has been soldered into the case, the assembly is cleaned with carbon tetrachloride and blown dry with compressed air. The mica insulation lining 16 is next inserted into the container by wrapping it around a mandrel, inserting it and allowing it to spring into place. Terminal 4 is then placed into the stem of the glass seal after asbestos insulator disc 12 and mica insulator disc 13 have been slipped over its stem.

Calcium coated dumbbell shaped electrodes 1 which have been folded over heat paper discs 2 with the calcium coating on the outside are pressed between flat surfaces to a pressure of 2½ tons on the ram of a hydraulic press. An uncoated dumbbell shaped electrode stamped from an uncoated nickel strip is folded over a heat paper disc and also pressed to a pressure of 2½ tons. Depending upon the number of cells desired in the battery one or more calcium coated electrode-heat paper asssemblies 1 and 2 are placed in the container 15 calcium side up into which the glass seal 14 has been soldered. The tabs 26 of each electrode assembly are staggered 90° from the preceeding one. Between each assembly, one or more electrolyte discs 3 are interposed, the number determining the life of each cell. The bottom of the pile in the container 15 consists of a calcium coated electrode while the top consists of an uncoated elecrode. Between each electrode (coated or uncoated) there is one or more electrolyte discs 3. An individual cell consists of a lower calcium layer, an intermediate electrolyte disc and a top nickel layer, the tab 26 of each electrode acting as a conductor for each cell in series with another adjacent cell or adjacent external electrodes.

Next a primer assembly 7, 8, 9 and 10 is pressed into the primer cavity of the primer holder. It is staked in place with a 360° circular stake. The holder is then placed within the opening in the container, on top of the cell pile. The container is crimped over the holder and terminal 4 is soldered externally to the stem of the glass seal. A coat of varnish is applied to the crimp and the holder. This completes the assembly of the battery.

Obviously, variations in the preparation of the components of the battery and in the assembly technique can be made.

The metal for the dumbbell shaped electrode may be nickel, nickel clad steel, "Inconel" mixture of copper and nickel made by International Nickel Company, Inc., New York, N.Y.) siliver or iron.

The metal used in the coating operation may be calcium magnesium or any other anode acting metal.

The solid electrolyte may consist of 50% lithium chloride-50% potassium chloride by weight, or 50% lithium bromide-50% potassium bromide by weight, or 50% lithium sulfate-50% potassium chloride mol percent.

The depolarizer used with the electrolyte may consist of 15% by weight of either potassium chromate molybdic oxide, vanadium pentoxide or potassium dichromate added to the electrolyte. The potassium dichromate could be fused onto the cathode. One could also paint tungstic anhydride in water slurry form on the Ni electrode and allow it to dry. A slurry of 80% tungstic anhydride and 20% lead chromate could also be used by painting the Ni electrode with the slurry and then fusing.

The heat paper may have zirconium-barium chromate; the zirconium content ranging from about 21% to about 31%, boron-barium chromate, the boron ranging from about 10% to about 20%, zirconium-iron oxide, the zirconium ranging from about 21% to about 31%. The amount used is dependant upon the heat desired. It has been found that 50 parts of the above mixtures to 10 parts fiber gives excellent results, but, of course, this ratio is variable depending, as stated above, on the heat desired to fuse the electrolyte.

Where ignition of the heat paper from other than an axial flash hole is used, other appropriate means for igniting, such as rim ignition using a ring shaped flash hole outside the sandwiched layers, may be used.

Obviously, other modification can be made in the thermal battery without departing from the spirit and scope of this invention.

The average performance of a number of batteries of this invention gives an activation time ranging from 0.05 seconds to 0.30 seconds, when tested against a load of 1200 milliamperes.

Having thus described the invention, what is claimed and desired to be secured by Letters Patent is as follows:

1. An electrode for a heat activated cell of the stacked disc type comprising a nickel metallic folder of circular planar section having a narrow joining fold portion between its leaves which enclose a layer of electrolyte fusible heat producing composition, the outer face of one of said leaves being coated with calcium.

2. A method for producing a heat activated cell anode comprising helically winding in overlapping fashion a metallic strip around a tapered drum, coating the external surfaces of the winding on said drum with a dissimilar metal of different electrode potential, unwinding said strip, transversely subdividing said strip, and folding said transverse subdivisions along the boundary line between the coated and the uncoated areas, with the coated area out.

3. A method for producing an electrode for a heat activated cell of the stacked disc type comprising helically winding in overlapping fashion, a cathode acting metallic strip around a tapered drum, coating the external surfaces of the winding on said drum with an anode acting metal unwinding said strip, stamping transverse portions from said strip and folding said transverse portion along the boundary line between the coated and the uncoated areas, with the coated side out.

4. A unit heat activated cell comprising two nickel metal folders of circular planar section, each having a narrow joining fold portion between its leaves which enclose a heat paper disc, said folders separated from each other by layers of fusible electrolyte, one of said folders being coated on its electrolyte engaging face with calcium.

5. The unit cell of claim 4 wherein the fusible electrolyte layer comprises two disc shaped pads of fiberglass tape impregnated with a solid mixture of lithium chloride, potassium chloride and potassium dichromate.

6. A heat activated battery comprising stacked cathode acting metal folders separated by layers of fusible electrolyte, each folder enclosing a layer of heat producing composition, an anode acting metallic coating on one electrolyte engaging face of each folder, the coated faces of each folder facing in the same direction, said stack being located between two external terminals.

7. A heat activated battery comprising stacked cathode acting metal folders of circular planar section, each said folder having a narrow joining fold portion between its leaves which enclose an electrolyte fusible, heat producing composition pad, said folders separated by layers of fusible electrolyte, an anode acting metallic coating on one electrolyte engaging face of each folder, the coated facings of each folder facing in the same direction, said stack being located between two external terminals within a container, one of said terminals closing off one end of the container and containing an igniter for ignition of said heat producing pads.

8. A heat activated battery comprising stacked cathode acting metal folders of circular planar section, each said folder having a narrow joining fold portion between its leaves which enclose an electrolyte fusible, heat producing composition pad, said folders separated by layers of fusible electroylte, an anode acting metallic coating one one electrolyte engaging face of each folder, the coated facings of each folder facing in the same direction, said stack being axially perforated and being located between two external terminals within a container, one of said terminals closing off one end of the container and containing an igniter in an axial cavity therein for ignition of said heat producing pads, and the other terminal being insulated from and extending beyond said container.

9. A heat activated battery comprising stacked nickel metal folders of circular planar section, each said folder having a narrow joining fold portion between its leaves which enclose a heat paper disc, said folders separated by layers of fusible electrolyte, a calcium coating on one electrolyte engaging face of each folder, the calcium coated faces of each folder facing in the same direction, said stack being axial perforated and being located between two external metallic electrodes within a metallic cup-shaped container, having an inner insulation lining disposed around said stack, one of said electrodes closing off one end of the container and containing an igniter in an axial cavity therein for flash ignition of said heat paper discs through their axial perforation, and the other electrode being insulated from and extending through the base of said container.

* * * * *